(12) United States Patent
Budde

(10) Patent No.: US 7,185,877 B2
(45) Date of Patent: Mar. 6, 2007

(54) QUICK-CONNECT COUPLING FOR A GAS APPLIANCE

(76) Inventor: Horst Budde, 5515 Braelawn Drive, Burnaby, British Columbia (CA) V5B 4S8

( * ) Notice: Subject to any disclaimer, the term of this patent is extended or adjusted under 35 U.S.C. 154(b) by 191 days.

(21) Appl. No.: 11/097,245

(22) Filed: Apr. 4, 2005

(65) Prior Publication Data

US 2006/0219970 A1  Oct. 5, 2006

(51) Int. Cl.
*F16L 29/00* (2006.01)
*F16K 51/00* (2006.01)

(52) U.S. Cl. ............... 251/149.9; 251/90; 137/614.06; 285/85

(58) Field of Classification Search ............ 251/149.9, 251/149, 286, 288, 90, 101, 102, 106, 110; 137/614.06; 285/84, 85, 86
See application file for complete search history.

(56) References Cited

U.S. PATENT DOCUMENTS

| | | | |
|---|---|---|---|
| 3,423,063 A * | 1/1969 | German | 251/149.6 |
| 3,693,655 A * | 9/1972 | Frisk | 137/599.11 |
| 4,181,150 A * | 1/1980 | Maldavs | 137/614.06 |
| 4,552,333 A * | 11/1985 | Niemi | 251/149.9 |
| 5,129,621 A * | 7/1992 | Maiville et al. | 251/149.9 |

\* cited by examiner

*Primary Examiner*—Eric Keasel
*Assistant Examiner*—Andrew J. Rost
(74) *Attorney, Agent, or Firm*—Brian M. Long

(57) ABSTRACT

A quick-connect coupling for a gas line has a socket member for connection to a gas line and a nipple for connection to a gas appliance, the nipple being engageable in the socket member for coupling the gas line to the appliance, with a sleeve displaceable between a locking position for securing the nipple in the socket member and a released position in which the nipple is free to be uncoupled from the socket member. A locking member is displaceable along a path of movement into an extended position to retain the sleeve in the locking position. A control knob connected to the gas valve is rotatable for opening and closing the gas valve to control gas flow through the socket member. The control knob has an abutment portion movable into the path of movement of the locking member for retaining the locking member in the extended position, the control knob having an opening in the abutment portion dimensioned to allow sliding displacement of the locking member from the extended position into a retracted position to release the sleeve from its locking position on rotation of the control knob into a valve-closed position.

8 Claims, 3 Drawing Sheets

QUICK-CONNECT COUPLING FOR A GAS APPLIANCE

BACKGROUND OF THE INVENTION

1. Field of the Invention

The present invention relates to a quick-connect coupling for connecting a gas supply line to a gas appliance.

2. Description of the Related Art

For connecting a gas line to a gas appliance, it is well known to provide a nipple connected to the appliance and, on an end of the gas supply line a socket member connected through a gas control valve to the gas supply line. The nipple can be coupled to the socket member for connecting the appliance to the gas line, a sleeve being slidable along the exterior of the socket member between a locking position, in which the sleeve causes the nipple to be secured in the socket member, and a released position, in which the nipple is free to move from or into the socket member.

As a precaution, it is also well known to provide the gas control valve with a control knob having a cam-like projection which, on rotation of the control knob into a valve-closed position, allows the sleeve to be moved from its locking position but, on rotation of the control knob into a valve-open position, moves into the path of movement of the sleeve so as to retain the sleeve in its locked position and thereby to prevent the nipple from being coupled with or uncoupled from the socket member. This prevents the escape of gas from the appliance when the gas line is being connected by the nipple to the socket member or disconnected by removal of the nipple from the socket member.

This prior arrangement of the control knob has the disadvantage that the cam-like member is necessarily relatively bulky and projects laterally from the gas valve when the control knob is moved into the valve closed position.

Other safety arrangements have been proposed for retaining the sleeve in its locked position while the valve is open, but these have been relatively complicated and, therefore, expensive.

BRIEF SUMMARY OF THE INVENTION

According to the present invention, there is provided a quick-connect coupling for a gas line with a socket member for connection to a gas line, a nipple for connection to an gas appliance, the nipple being engageable in the socket member for coupling the gas line to an appliance, and a sleeve displaceable between a locking position for securing the nipple in the socket member and a released position in which the nipple is free to be uncoupled from the socket member. A locking member is displaceable into an extended position in which the locking member retains the sleeve in the locking position, and a control knob is connected to gas valve for controlling gas flow through the socket member, the control knob being rotatable for opening and closing the gas valve. The control knob has an abutment portion movable into the path of movement of the locking member for retaining the locking member in the extended position when the control knob is in a valve-open position and an opening in the abutment portion, the opening being dimensioned to allow sliding displacement of the locking member from the extended position and into a retracted position to release the sleeve from its locking position on rotation of the control knob into a valve-closed position.

In a preferred embodiment of the invention, the locking member is biassed toward the path of movement of the sleeve by a spiral spring located in the control knob and the abutment portion comprises a circularly curved peripheral surface of the control knob.

BRIEF DESCRIPTION OF THE DRAWINGS

The invention will be more readily understood from the following description of an embodiment thereof given, by way of example only, with reference to the accompanying drawings, in which:—

DESCRIPTION OF THE PREFERRED EMBODIMENT

Figure 1:
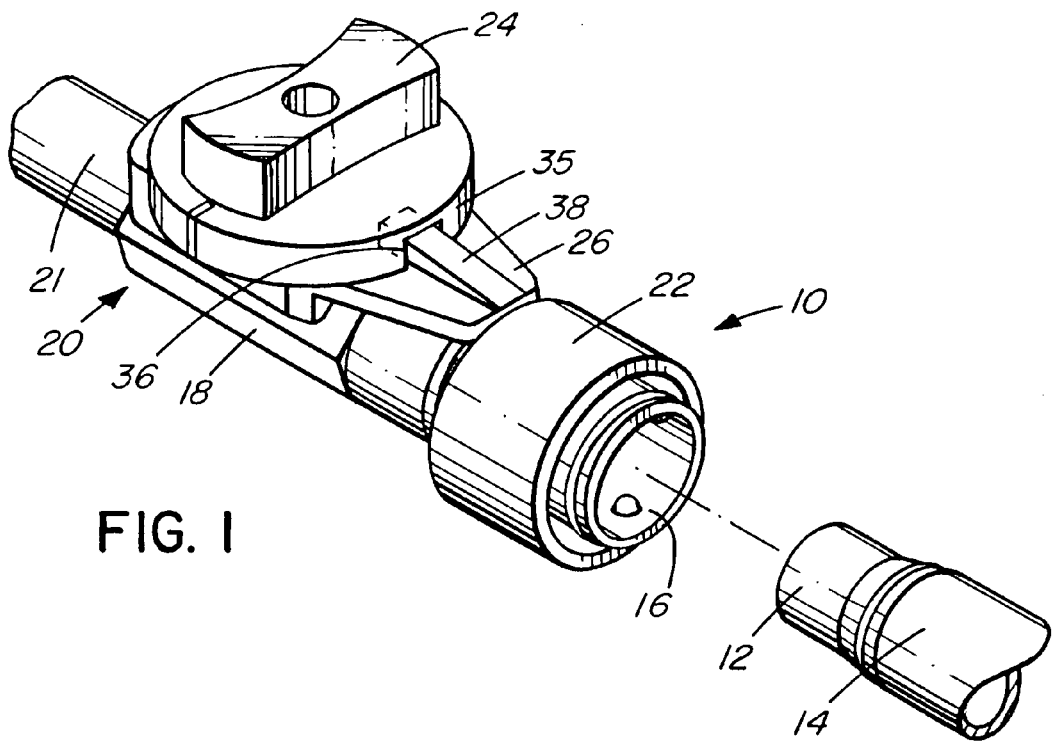
FIG. 1 shows a view in perspective of a gas line quick-connect coupling, embodying the present invention, in a released or uncoupled condition.
Figure 2:
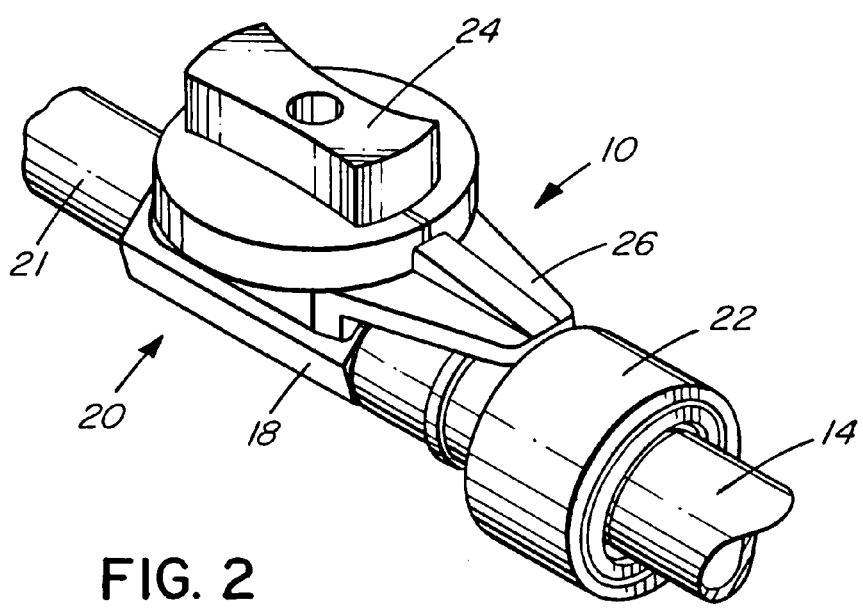
FIG. 2 shows a view in perspective corresponding to that of FIG. 1 but with the quick-connect coupling in its coupled condition.

In FIGS. 1 and 2 of the accompanying drawings, there is illustrated a quick-connect coupling indicated generally by reference numeral 10, which includes a nipple 12 for connection through a gas line 14 to an appliance (not shown) and a socket member 16 connected through a valve housing 18 of a gas flow control valve, indicated generally by reference numeral 20, to a gas line 21 for supplying gas to the appliance. A sleeve 22 is slidable relative to the valve housing between a released position, in which it frees the nipple to be coupled with or uncoupled from the socket member 16 and a locking position in which it locks the nipple in the socket member 16 or prevents the nipple 12 from being inserted into the socket member 16.

The construction and operation of the nipple 12, the socket member 16, the sleeve 22 and the gas control valve 20, which are well known in the art, are similar for example to those disclosed in U.S. Pat. No. 5,172,723, issued Dec. 22, 1992 to Malcolm B Sturgis, and are therefore not described in greater detail herein.

The gas control valve 20 is provided with a control knob 24 and a locking member 26.

As can be seen from FIG. 4, the locking member 26 has a body portion 28 which extends between the control knob 24 and the valve housing 18, and the locking member 26 is slidably displaceable along the valve housing 18 as described in greater detail below. The body portion 28 is formed with an elongate slot 30, and the control knob 24 has a stem 32 extending into the slot 30.

Figure 3:
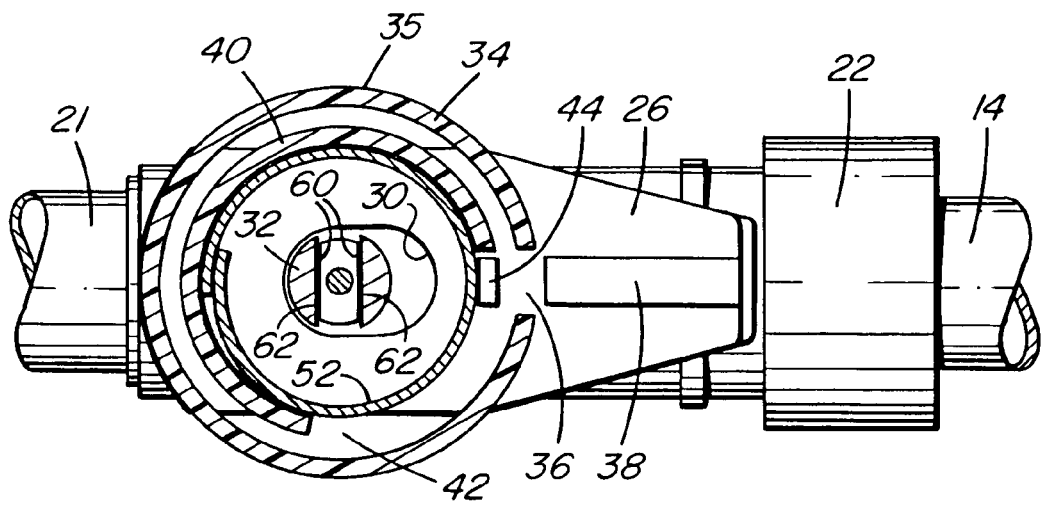
FIG. 3 shows a plan view of the quick-connect coupling of FIGS. 1 and 2, with parts of a gas flow control device shown in cross-section.

The control knob 24 also has a circular skirt portion or abutment portion 34, which has a circularly curved peripheral outer surface and is interrupted by a rectangular opening 36 (FIG. 3). The body portion 28 of the locking member 26 is provided at one end with a projection in the form of a stop 38, which is of rectangular cross-section, and the locking member 26 is slidably displaceable to the left, from an extended position in which it is shown in FIGS. 3 and 4 to a retracted position in which it is shown on FIG. 1, the rectangular opening 36 being adapted to receive the stop 38 when the locking member 26 is displaced to its retracted position.

The control knob 24 further includes a circularly curved inner wall 40, which is spaced radially inwardly from the circular skirt portion 34. As can be seen from FIG. 3, the skirt portion 34 is interrupted by a gap 42 extending through slightly more than 90 degrees around the axis of rotation of the control knob 24.

Figure 4:
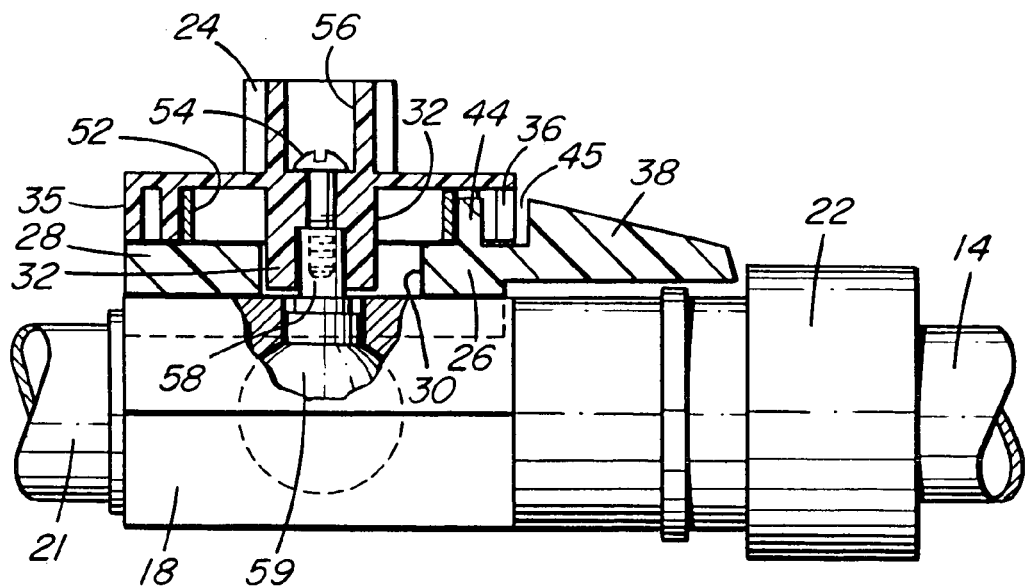
FIG. 4 shows a view in side elevation of the quick-connect coupling of FIGS. 1 and 2, with the gas flow control device shown in vertical cross-section.

The locking member 26 is also formed with an abutment 44, which is spaced from the stop 26 by a gap 45 and which, when the locking member 26 is in the extended position in which it is shown in FIGS. 3 and 4, is located in the arcuate gap 42 in the skirt portion 34. The abutment 44 limits the range of rotation of the control knob 24, between its valve-open and valve-closed positions, to an angle of 90 degrees, corresponding to the gap 42.

Figure 5:
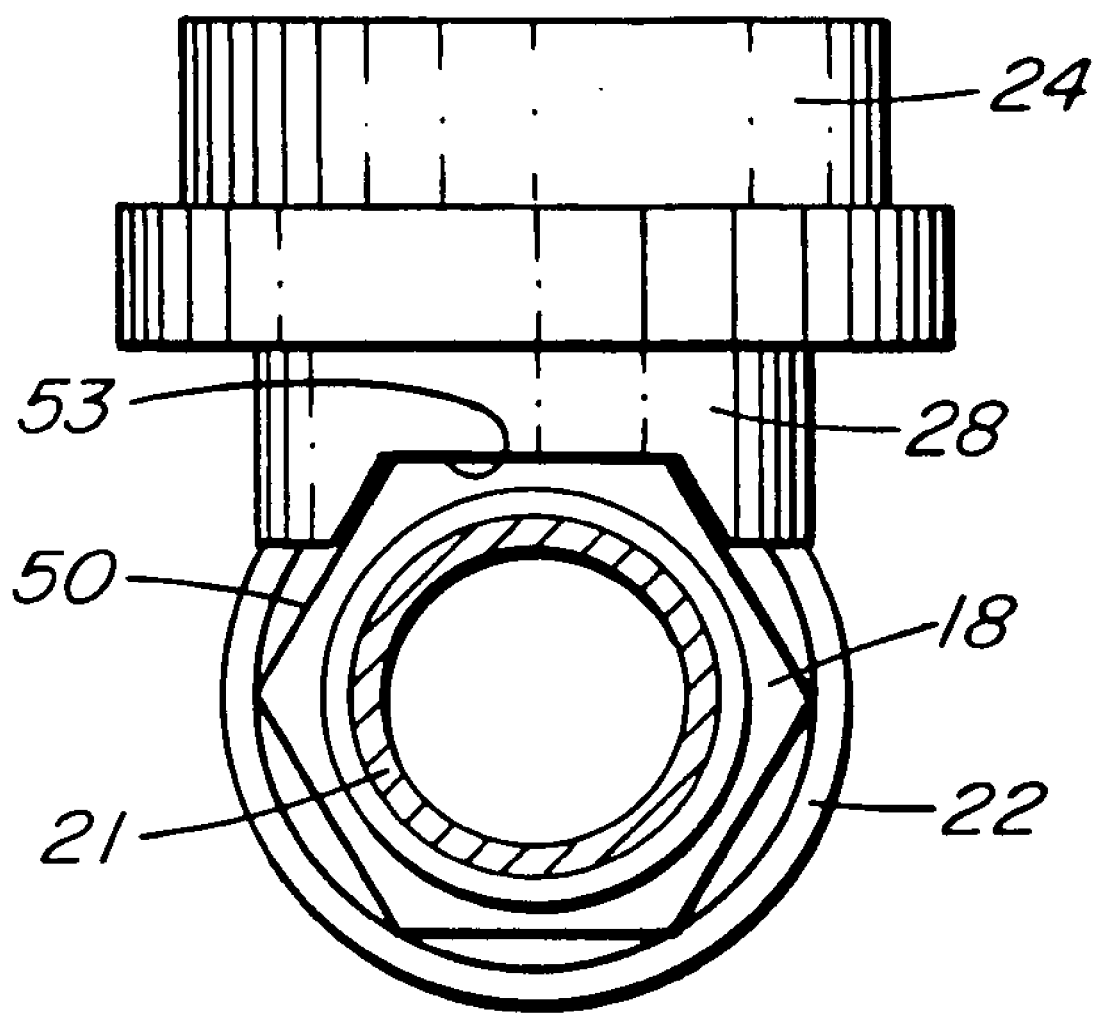
FIG. 5 shows a view of the quick release coupling of FIGS. 1–4 in end elevation, from the left-hand end of FIGS. 3 and 4.

Referring to FIG. 5 of the drawings, the gas valve housing 18 has a convex outer surface 50 of hexagonal cross-section, and the body portion 28 of the locking member 26 has a concave surface 53 which is complimentary to and opposed to the convex surface 50 and which is slidable along the convex outer surface 50. The locking member 26 is thus guided for sliding displacement longitudinally of the valve housing 18 between the retracted and extended positions of the locking member 26. To facilitate the sliding displacement of the locking member 26, the locking member 26 and the control knob 24 are both formed as mouldings of plastic material and therefore have low coefficients of friction.

Within the circular inner wall 40 of the control knob 24, there is located a spiral spring 52 (FIG. 3), which resiliently biases the abutment 42 and, thereby, the locking member 26 towards the extended position of the locking member 26 and, thus, into the path of movement of the sleeve 22.

The control knob 24 is secured to the gas valve 20 by means of a screw 54 inserted through a upwardly-open cylindrical recess 56 in the top of the control knob 24 into threaded engagement with a projection 58 extending from a ball valve member 59 of the gas valve 20. More particularly, the control knob stem 32 is bifurcated to provide two opposed flat faces 60 in contact with flat faces 62 on opposite sides of the projection 58. Consequently, rotation of the control knob 24 causes the projection 58 to be correspondingly rotated, which, in turn, opens and closes the gas valve 20.

The operation of the above-described gas flow control device and its associated gas valve and quick-connect coupling is as follows:—

When it is desired to insert the nipple 12 into the socket member 16, as illustrated in FIG. 1, in order to connect the gas line 14 to the gas line 21, the control knob 24 is rotated into the valve-closed position, in which it is shown in FIG. 1 and in which the gas flow valve 20 is closed to prevent gas flow through the socket member 16. This rotation of the control knob 24 brings the opening 36 in the skirt portion 34 of the control valve 24 into alignment with the stop 38 on the locking member 26. The locking member 26 can therefore be displaced along the gas valve housing 18 to the left, as viewed in FIGS. 3 and 4, against the action of the spring 52 on the abutment 44 and into its retracted position, in which it is shown in FIG. 1. In this position it allows the sleeve 22 to be slidingly displaced towards the gas valve housing 18, thereby allowing the nipple 12 to be inserted into the socket member 16. As will be apparent, when the nipple 12 is already inserted into the socket member 16, these positions of the control knob 24, the locking member 26 and the sleeve 22 will allow the nipple 12 to be removed from the socket member 16 in order, thus, to uncouple the gas line 14 from the gas control valve 20.

When the gas line 14 has been connected to the gas control valve 20, by insertion of the nipple 12 into the socket member 16 as described above, and by subsequent sliding of the sleeve 22 in the opposite direction into its locking position, i.e. away from the valve housing 18 towards the gas line 14, the nipple 12 is thereby retained in the socket member 16, in a manner well known in the art. The control knob 22 can then be rotated back into its valve-open position, in which the control knob 22 is shown in FIGS. 2–4, to open the gas flow valve 20 and to thereby permit gas flow from the gas line 21 through the nipple 12 and the gas line 14 to the appliance (not shown).

In this position of the control knob 22, the stop 44 (FIG. 3) is displaced from the opening 36 in the skirt portion 34 of the control knob 24, i.e. the stop 44 is moved radially outwardly from the control knob into the position in which the stop 44 is shown in FIGS. 2 through 4, and the slide member 26 is thereby moved into the path of movement of the sleeve 22 and prevents the sleeve from being displaced from its locking position towards the valve housing 18.

The sliding displacement of the locking member 26 relative to the valve housing 18 between the retracted and extended positions of the locking member 26 is enabled by the elongate shape of the slot 60, which allows the locking member 26 to slide relative to the control knob stem 32.

As will be apparent to those skilled in the art, various modifications may be made in the above described apparatus within the scope of the appended claims.

I claim:

1. A quick-connect coupling for a gas line, the coupling comprising:
    a socket member for connection to a gas line;
    a nipple for connection to an gas appliance, the nipple being engageable in the socket member for coupling the gas line to the appliance;
    a sleeve displaceable between a locking position for securing the nipple in the socket member and a released position in which the nipple is free to be uncoupled from the socket member;
    a locking member displaceable into an extended position in which the locking member retains the sleeve in the locking position;
    a gas valve for controlling gas flow through the socket member; and
    a control knob connected to the gas valve and rotatable for opening and closing the gas valve;
    the control knob having an abutment portion movable into the path of movement of the locking member for retaining the locking member in the extended position; and
    the control knob having an opening in the abutment portion and the opening being dimensioned to allow sliding displacement of the locking member from the extended position and into a retracted position to release the sleeve from its locking position on rotation of the control knob into a valve-closed position.

2. A gas flow control device as claimed in claim 1, including a spring biasing the slide member towards its extended position.

3. A gas flow control device as claimed in claim 2, wherein the spring is located in the control knob.

4. A gas flow control device as claimed in claim 2, wherein the spring is a spiral spring.

5. A gas flow control device as claimed in claim 1, wherein the abutment portion comprises a circularly curved peripheral surface of the control knob.

6. A gas flow control device as claimed in claim 1, wherein the gas valve has a valve housing, the locking member has a body portion slidable between the control knob and the valve housing and formed with a slot and the control knob has a stem extending into the slot for connection to the gas control valve, the slot being dimensioned to allow the sliding displacement of the locking member into and out of the extended position and the locking member including a stop displaceable into the opening in the abutment portion of the control knob in the valve-closed position of the control knob.

7. A gas flow control device as claimed in claim 6, wherein the gas control valve housing has a convex outer surface and the locking member has a concave surface complimentary to and opposed to the convex outer surface and slidable along the convex outer surface on movement of the locking member into and from the path of movement of the sleeve.

8. A gas flow control device as claimed in claim 7, wherein the convex outer surface is of hexagonal cross-section.

* * * * *